United States Patent [19]

Fuentes, Jr. et al.

[11] Patent Number: 4,526,943

[45] Date of Patent: Jul. 2, 1985

[54] PROCESS FOR POLYMERIZING OLEFINS IN THE PRESENCE OF A CATALYST PREPARED FROM ORGANOMAGNESIUM COMPOUND, ORGANIC HYDROXYL-CONTAINING COMPOUND, REDUCING HALIDE SOURCE AND TRANSITION METAL COMPOUND

[75] Inventors: Ricardo Fuentes, Jr.; Calvin P. Esneault, both of Baton Rouge, La.

[73] Assignee: The Dow Chemical Company, Midland, Mich.

[21] Appl. No.: 574,754

[22] Filed: Jan. 26, 1984

Related U.S. Application Data

[63] Continuation-in-part of Ser. No. 403,206, Jul. 29, 1982, abandoned.

[51] Int. Cl.$^3$ .......................... C08F 4/02; C08F 10/00
[52] U.S. Cl. .................... 526/133; 526/124; 526/142; 526/352
[58] Field of Search ................. 526/124, 133, 142

[56] References Cited

U.S. PATENT DOCUMENTS

| | | | |
|---|---|---|---|
| 3,901,863 | 8/1975 | Berger et al. | 526/124 |
| 4,172,050 | 10/1979 | Gessell | 526/151 |
| 4,189,553 | 2/1980 | Birkelbach | 526/151 |
| 4,199,473 | 4/1980 | Timms | 526/124 |
| 4,244,838 | 1/1981 | Gessell | 526/125 |
| 4,246,383 | 1/1981 | Gessell | 526/92 |
| 4,296,223 | 10/1981 | Berger | 526/125 |
| 4,319,011 | 3/1982 | Lowery et al. | 526/151 |
| 4,387,200 | 6/1983 | Gessell et al. | 526/122 |
| 4,426,316 | 1/1984 | Gessell | 526/124 |

FOREIGN PATENT DOCUMENTS

| | | | |
|---|---|---|---|
| 0000007 | 12/1978 | European Pat. Off. | |
| 1275641 | 5/1972 | United Kingdom | |
| 1464909 | 2/1977 | United Kingdom | 526/124 |

OTHER PUBLICATIONS

Allowed application Ser. No. 416,447 filed by Donald Earl Gessell.
Pending application Ser. No. 416,422 filed by Donald Earl Gessell.

*Primary Examiner*—Edward J. Smith
*Attorney, Agent, or Firm*—J. G. Carter

[57] ABSTRACT

Olefins are polymerized in the presence of, as a catalyst therefor, the catalytic reaction product resulting from admixing
(A) at least one hydrocarbon soluble organomagnesium material;
(B) at least one organic hydroxyl-containing material;
(C) at least one reducing halide source; and
(D) at least one transition metal (Tm) compound.

8 Claims, No Drawings

PROCESS FOR POLYMERIZING OLEFINS IN THE PRESENCE OF A CATALYST PREPARED FROM ORGANOMAGNESIUM COMPOUND, ORGANIC HYDROXYL-CONTAINING COMPOUND, REDUCING HALIDE SOURCE AND TRANSITION METAL COMPOUND

CROSS-REFERENCE TO RELATED APPLICATION

This application is a continuation-in-part of application Ser. No. 403,206 filed July 29, 1982, now abandoned.

BACKGROUND OF THE INVENTION

This invention relates to a new catalyst composition useful for initiating and promoting polymerization of one or more α-olefins and to a polymerization process employing such a catalyst composition.

It is well known that olefins such as ethylene, propylene, and 1-butene in the presence of metallic catalysts, particularly the reaction products of organometallic compounds and transition metal compounds can be polymerized to form substantially linear polymers of relatively high molecular weight. Typically such polymerizations are carried out at relatively low temperatures and pressures.

Among the methods for producing such linear olefin polymers, some of the most widely utilized are those described by Professor Karl Ziegler in U.S. Pat. Nos. 3,113,115 and 3,257,332. In these methods, the catalyst employed is obtained by admixing a compound of a transition metal of Groups 4b, 5b, 6b and 8 of Mendeleev's Periodic Table of Elements with an organometallic compound. Generally the halides, oxyhalides and alkoxides or esters of titanium, vanadium and zirconium are the most widely used transition metal compounds. Common examples of the organometallic compounds include the hydrides, alkyls and haloalkyls of aluminum, alkylaluminum halides, Grignard reagents, alkali metal aluminum hydrides, alkali metal borohydrides, alkali metal hydrides, alkaline earth metal hydrides and the like. Usually, the polymerization is carried out in a reaction medium comprising an inert organic liquid, e.g., an aliphatic hydrocarbon and the aforementioned catalyst. One or more olefins may be brought into contact with the reaction medium in any suitable manner, and a molecular weight regulator, such as hydrogen, is often added to the reaction vessel in order to control the molecular weight of the polymers. Such polymerization processes are either carried out at slurry polymerization temperatures (i.e., wherein the resulting polymer is not dissolved in the hydrocarbon reaction medium) or at solution polymerization temperatures (i.e., wherein the temperature is high enough to solubilize the polymer in the reaction medium).

Following polymerization, it is common to remove catalyst residues from the polymer by repeatedly treating the polymer with alcohol or other deactivating agent such as an aqueous basic solution. Such catalyst deactivation and/or removal procedures are expensive both in time and material consumed as well as the equipment required to carry out such treatment.

Gessell's U.S. Pat. Nos. 4,244,838 and 4,246,383 and pending applications, Ser. No. 192,959 filed Oct. 1, 1980, now U.S. Pat. No. 4,496,660 and Ser. No. 192,960 filed Oct. 1, 1980, now abandoned by Gessell, Gibbs and Fuentes, Jr., disclose catalysts prepared by employing an organic hydroxyl-containing material. However, such catalysts are directed only to the resultant solid reaction product which must be separated from the liquid portion and washed. It would be desirable to employ a catalyst which does not require the recovery of the solid reaction product and the attendant washing steps.

It is advantageous for ethylene polymers to have a broad molecular weight distribution for the purpose of producing bottles, pipes, films, and coatings by blow molding, since polymers having a narrow molecular weight distribution have poor melt flowability and are harder to process than broad molecular weight distribution polymers. Also, narrow molecular weight distribution polymers require more energy to process them by extrusion methods and give products that have rough surfaces due to melt fracture of the polymer. The rough surface is an undesirable property and leads to lower commercial value of the product.

The present invention provides a catalyst for polymerizing α-olefins which catalysts are sufficiently efficient so as to not require their removal from the polymer and their preparation does not require recovery and washing of the solid reaction product nor is heating required to prepare the catalyst. The resultant polymers have a relatively wide molecular weight distribution.

SUMMARY OF THE INVENTION

The present invention is directed to the catalytic product resulting from admixing in an inert hydrocarbon diluent and in an atmosphere which excludes moisture and oxygen (A) at least one hydrocarbon soluble organomagnesium material;

(B) at least one organic hydroxyl-containing material;

(C) at least one reducing halide source; and (D) at least one transition metal (Tm) compound; and wherein (1) the components are added in the order (A), (B), (C) and (D) or (A), (B), (D) and (C); and (2) the components are employed in quantities so as to provide the following atomic ratios Mg:Tm of from about 0.1:1 to about 100:1 preferably from about 1:1 to about 40:1 and most preferably from about 5:1 to about 20:1;

Cl:Mg of from about 3:1 to about 20:1, preferably from about 6:1 to about 20:1 and most preferably from about 8:1 to about 12:1; and the OH:total number of hydrocarbyl groups attached to a metal atom in component (A) is from about 0.5:1 to about 1.5:1 and preferably from about 0.7:1 to about 1.2:1.

A further aspect of the invention is a process for polymerizing α-olefins or mixtures thereof which comprises conducting the polymerization in the presence of the aforementioned catalysts.

DESCRIPTION OF THE PREFERRED EMBODIMENTS

The organomagnesium materials which are suitably employed in the present invention include those represented by the formula $R_2Mg \cdot xMeR'_{x'}$ wherein each R is independently a hydrocarbyl group and each R' is independently a hydrogen, hydrocarbyl or hydrocarbyloxy group, Me is Al, Zn or B, x has a value from 0 to 10 and x' has a value equal to the valence of Me.

The term hydrocarbyl as employed herein refers to a monovalent hydrocarbon group such as alkyl, cycloalkyl, aryl, aralkyl, alkenyl and similar hydrocarbon groups having from 1 to about 20 carbon atoms with alkyl having from 1 to 10 carbon atoms being preferred.

The term hydrocarbyloxy as employed herein refers to monovalent oxyhydrocarbon group such as alkoxy, cycloalkoxy, aryloxy, aralkoxy, alkenoxy and similar oxyhydrocarbon groups having from 1 to about 20 carbon atoms with alkoxy groups having from 1 to 10 carbon atoms being the preferred hydrocarbyloxy groups.

The quantity of $MeR'_{x'}$, i.e. the value of x, is preferably the minimum amount which is sufficient to render the magnesium compound soluble in the inert solvent or diluent which is usually a hydrocarbon or mixture of hydrocarbons. The value of x therefore is from zero to about 10, usually from about 0.2 to about 2.

Particularly suitable organomagnesium compounds include, for example, di-(n-butyl) magnesium, n-butyl-sec-butyl magnesium, diisopropyl magnesium, di-n-hexyl magnesium, isopropyl-n-butyl magnesium, ethyl-n-hexyl magnesium, ethyl-n-butyl magnesium, di-(n-octyl) magnesium, butyl octyl magnesium and such complexes as di-n-butyl magnesium.⅓ aluminum triethyl, di-(n-butyl) magnesium.1/6 aluminum triethyl, n-butyl-sec-butyl magnesium.½ triisobutylaluminum, butyl ethyl magnesium.½ triisobutylaluminum, butyl ethyl magnesium.¼ triisobutylaluminum, butyl octyl magnesium.½ triisobutylaluminum, dihexylmagnesium.½ triisobutylaluminum, mixtures thereof and the like.

Suitable hydroxyl-containing organic compounds include, for example, alcohols, glycols, polyoxyalkylene glycols, mixtures thereof and the like.

Suitable such compounds include those represented by the formulas

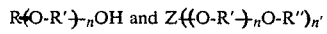

wherein each R is a hydrocarbyl group having from 1 to about 20, preferably from 1 to about 10, carbon atoms or a hydrogen; each R' is independently a divalent hydrocarbyl group having from 1 to about 20, preferably from 1 to about 10, carbon atoms; each R'' is independently hydrogen or a hydrocarbyl group having from 1 to about 20, preferably from 1 to about 10, carbon atoms, at least one of which is hydrogen; Z is a multivalent organic group containing from 2 to about 20 carbon atoms; n has a value from zero to about 10; and n' has a value of from 2 to about 10.

Particularly suitable organic hydroxyl-containing compounds include alcohols such as for example methyl alcohol, ethyl alcohol, n-propyl alcohol, isopropyl alcohol, n-butyl alcohol, sec-butyl alcohol, tert-butyl alcohol, 2-pentanol, n-octyl alcohol, octadecyl alcohol, glycols, 1,2-butylene glycol, 1,3-propylene glycol, 1,4-butanediol, 1,6-hexane diol, other hydroxyl containing compounds such as, for example, glycerine, trimethylol propane, hexane triol, phenol, 2,6-di-tert-butyl-4-methylphenol, mixtures thereof and the like. Also suitable are the adducts of ethylene oxide, 1,2-propylene oxide, 1,2-butylene oxide, 2,3-butylene oxide, styrene oxide or mixtures of such oxides with the previously mentioned or other hydroxyl-containing compounds such as pentaerythritol, sucrose, sorbitol and the like, as well as the alkyl and aryl capped hydroxyl-containing compounds so long as there remains at least 1 hydroxyl group per molecule.

Suitable reducing halide sources include those represented by the formulas

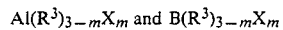

including mixtures thereof wherein each $R^3$ is independently hydrogen or a hydrocarbyl group as hereinbefore defined, and m has a value from 1 to 2.

Particularly suitable reducing halides include, for example, ethylaluminum dichloride, diethylaluminum chloride, ethylaluminum sesquichloride, ethylboron dichloride, diethylboron chloride, mixtures thereof and the like.

Suitable transition metal compounds which can be employed include those represented by the formulas $TmY_nX_{z-n}$, and

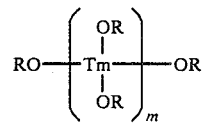

wherein Tm is a transition metal in its highest stable valence state and being selected from groups IV-B, V-B and VI-B of the Periodic Table of the Elements; Y is oxygen, OR'' or NR''$_2$; R is a hydrocarbyl group having from 1 to about 20 carbon atoms, preferably from 1 to about 10; R'' is hydrogen or a hydrocarbyl group having from 1 to about 20 carbon atoms; X is a halogen, preferably chlorine or bromine; z has a value corresponding to the valence of the transition metal, Tm; m has a value from 2 to about 20, preferably from 2 to about 10; n has a value of from zero to 5 with the value of z-n being from zero up to a value equal to the valence state of the transition metal, Tm.

Particularly suitable transition metal compounds include, for example, titanium tetrachloride, titanium tetrabromide, dibutoxy titanium dichloride, monoethoxy titanium trichloride, isopropoxytitanium trichloride, tetraisopropoxytitanium, tetrabutyoxytitanium, tetra(2-ethylhexoxy)titanium, isopropyltitanate decamer, chromyl chloride, vanadium oxytrichloride, zirconium tetrachloride, tetrabutoxyzirconium, vanadium tetrachloride, mixtures thereof and the like.

Suitable organic inert diluents in which the catalyst can be prepared and in which the α-olefin polymerization can be conducted include, for example, liquefied ethane, propane, isobutane, n-butane, isopentane, n-pentane, n-hexane, the various isomeric hexanes, isooctane, paraffinic mixtures of alkanes having from 8 to 12 carbon atoms, cyclohexane, methylcyclopentane, dimethylcyclohexane, dodecane, eicosane industrial solvents composed of saturated or aromatic hydrocarbons such as kerosene, naphthas, etc., especially when freed of any olefin compounds and other impurities, and especially those having boiling points in the range from about −50° to about 200° C. Also included as suitable inert diluents are benzene, toluene, ethylbenzene, cumene, decalin and the like.

Suitable cocatalysts or activators with which the catalysts of the present invention can be reacted, contacted or employed in the polymerization of α-olefins includes those aluminum, boron, zinc or magnesium compounds represented by the formulas $Al(R^3)_{3-a}X'_a$, $B(R^3)_{3-a}X'_a$, $MgR^3_2$, $MgR^3X'$, $ZnR^3_2$, or mixtures thereof wherein $R^3$ is as previously defined; X' is a halogen, preferably chlorine or bromine; and a has a value of from zero to 2, preferably zero to 1 and most preferably zero.

Particularly suitable cocatalysts or activators include, for example, diethylaluminum chloride, ethylaluminum dichloride, diethylaluminum bromide, triethylaluminum, triisobutylaluminum, diethylzinc, dibutylmagnesium, butylethylmagnesium, butylmagnesium chloride, diisobutylaluminum hydride, isoprenylaluminum, triethylboron, trimethylaluminum, mixtures thereof and the like.

The cocatalysts or activators are employed in quantities such that the atomic ratio of the Al, B, Mg, Zn or mixtures thereof to Tm is from about 0.1:1 to about 1000:1, preferably from about 5:1 to about 500:1 and most preferably from about 10:1 to about 200:1.

The catalyst and cocatalyst or activator may be added separately to the polymerization reactor or they may be mixed together prior to addition to the polymerization reactor.

Olefins which are suitably homopolymerized or copolymerized in the practice of this invention are generally any one or more of the aliphatic α-olefins such as, for example, ethylene, propylene, butene-1, pentene-1, 3-methylbutene-1, 4-methylpentene-1, hexene-1, octene-1, dodecene-1, octadecene-1, 1,7-octadiene and the like. It is understood that α-olefins may be copolymerized with one or more other α-olefins and/or with small amounts i.e., up to about 25 weight percent based on the polymer of other polymerizable ethylenically unsaturated monomers such as styrene, α-methylstyrene and similar ethylenically unsaturated monomers Which do not destroy conventional Ziegler catalysts. Most benefits are realized in the polymerization of aliphatic α-monoolefins, particularly ethylene and mixtures of ethylene and up to 50 weight percent, especially from about 0.1 to about 40 weight percent of propylene, butene-1, hexene-1, octene-1, 4-methylpentene-1, 1,7-octadiene or similar α-olefin or E-diolefin based on total monomer.

In the polymerization process employing the aforementioned catalytic reaction product, polymerization is effected by adding a catalytic amount of the catalyst composition to a polymerization zone containing α-olefin monomer, or vice versa. The polymerization zone is maintained at temperatures in the range from about 0° to about 300° C., preferably at slurry polymerization temperatures, e.g., from about 0° to about 95° C., more preferably from about 50° to about 90° C., for a residence time of from about 15 minutes to about 24 hours, preferably from about 30 minutes to about 8 hours. It is generally desirable to carry out the polymerization in the absence of moisture and oxygen and a catalytic amount of the catalytic reaction product is generally within the range from about 0.0001 to about 0.1 milligram-atoms transition metal per liter of diluent. It is understood, however, that the most advantageous catalyst concentration will depend upon polymerization conditions such as temperature, pressure, diluent and presence of catalyst poisons and that the foregoing range is given to obtain maximum catalyst yields. Generally in the polymerization process, a carrier which may be an inert organic diluent or excess monomer is generally employed. In order to realize the full benefit of the high efficiency catalyst of the present invention care must be taken to avoid oversaturation of the diluent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitable as defined hereinbefore.

The polymerization pressures preferably employed are relatively low, e.g., from about 10 to about 500 psig. However, polymerization within the scope of the present invention can occur at pressures from atmospheric up to pressures determined by the capabilities of the polymerization equipment. During polymerization it is desirable to agitate the polymerization recipe to obtain better temperature control and to maintain uniform polymerization mixtures throughout the polymerization zone.

Hydrogen is often employed in the practice of this invention to control the molecular weight of the resultant polymer. For the purpose of this invention, it is beneficial to employ hydrogen in concentrations ranging from about 0 to about 80 volume percent in the gas or liquid phase in the polymerization vessel. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst. Using the general method described, the polymerization reactor may be operated liquid full or with a gas phase and at solution or slurry polymerization conditions.

The monomer or mixture of monomers is contacted with the catalytic reaction product in any conventional manner, preferably by bringing the catalyst composition and monomer together with intimate agitation provided by suitable stirring or other means. Agitation can be continued during polymerization. In the case of more rapid reactions with more active catalysts, means can be provided for refluxing monomer and solvent, if any of the latter is present and thus remove the heat of reaction. In any event, adequate means should be provided for dissipating the exothermic heat of polymerization, e.g., by cooling reactor walls, etc. If desired, the monomer can be brought in the vapor phase into contact with the catalytic reaction product, in the presence or absence of liquid material. The polymerization can be effected in a batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent. The resultant polymer is found to contain insignificant amounts of catalyst residue.

The following examples are given to illustrate the invention, and should not be construed as limiting its scope. All parts and percentages are by weight unless otherwise indicated.

In the following examples, the flow rates for the melt index value, $I_2$, and for the value $I_{10}$, were determined by ASTM D 1238 conditions E and N, respectively. The flow rate ratio, FRR, or $I_{10}/I_2$, is a dimensionless number derived by dividing the flow rate at Condition N by the flow rate at Condition E and is discussed in section 7.3 of ASTM D 1238. The apparent bulk density is determined as an unsettled bulk density according to the procedure of ASTM 1895 employing a paint volumeter from Sargent-Welch Scientific Company (catalog no. S-64985) as the cylinder instead of the one specified by the ASTM procedure. The unannealed polymer densities were determined by Method A-2 described in section 13 of ASTM D 792. The liquid used in the density determination was heptane.

GENERAL PROCEDURE

In each of the following examples, unless otherwise stated, the catalyst components were blended while in a gloved box filled with dry oxygen-free nitrogen.

In the examples, the dibutylmagnesium was a commercial material obtained as a solution in a heptanehexane mixture from the Lithium Corporation of America, the dihexylmagnesium was a commercial material obtained as a hexane solution from the Ethyl Corporation or Texas Alkyls, Inc., the butylethylmagnesium was a commercial material obtained as a heptane solution from Texas Alkyls, Inc., and the butyloctylmagnesium was a commercial material obtained as a hexane solution from Schering Aktiengesellschaft. All ratios are molar ratios unless otherwise indicated. The 1.46 molar diethylaluminum chloride, 1.53 molar ethylaluminum dichloride, 0.616 molar triisobutylaluminum and 0.921 molar triethylaluminum were obtained as solutions in hexane from Ethyl Corporation or Texas Alkyls, Inc. Isopar ®️ E was obtained from Exxon Company USA and is an isoparaffinic hydrocarbon fraction having a boiling range of 116°–134° C.

EXAMPLE 1

A. Preparation of Reaction Product of Organomagnesium Material and Organic Hydroxyl-Containing Material A masterbatch solution was prepared by mixing 391.5 ml of 0.637 M butylethylmagnesium (250 mmoles) and 202.9 ml of 0.616 M triisobutylaluminum (125 mmoles). Then 65.4 ml of neat n-propylalcohol (875 mmoles) were added dropwise so as to maintain the temperature at about 40° C. The resultant clear, water-white solution was diluted volumetrically with hexane to 750 ml. Concentration of magnesium in this masterbatch solution was 0.3333 M. The ratio of ROH:R groups (i.e., added ROH to R groups attached to magnesium and aluminum in component A) was 1:1.

B. Catalyst Preparation

To a 75 ml aliquot of the masterbatch solution prepared in (1-A) above containing 25 mmoles of magnesium were added dropwise 1.5 ml of neat tetraisopropoxytitanium (5.04 mmoles). The solution did not change appearance. Then 65.5 ml of 1.53 M ethylaluminum dichloride (100.22 mmoles) were added dropwise at about 22° C. A brown slurry resulted after complete addition of ethylaluminum dichloride. The catalyst slurry volume was adjusted to 200 ml and fresh hexane and a 50 ml aliquot set aside for polymerization. The Mg:Ti and Cl:Mg atomic ratios for this catalyst were 4.96:1 and 8.02:1 respectively.

C. Polymerization

An aliquot of catalyst, prepared in (1-B) above, containing 0.0099 mmole of titanium was added to a 2.5 liter stirred stainless steel reactor containing 1.6 liter of dry, oxygen-free hexane and 3.2 ml of 0.616 M triisobutylaluminum (ATB) in hexane. The atomic ratio of Al:Ti was 200:1. The reactor nitrogen atmosphere was replaced with hydrogen by purging, the reactor contents were heated to 85° C. and the reactor pressure was adjusted to 70 psig (482.6 kPa) with hydrogen. Ethylene was added to maintain a reactor pressure of 170 psig (1172.1 kPa). After two hours (7200 s) at 85° C., the reactor contents were filtered and the polyethylene dried in a vacuum overnight at about 60° C. to yield 275 g of polyethylene with a melt index, $I_2$, of 3.8, an $I_{10}/I_2$ of 9.73, and a bulk density of 26.2 lb/ft$^3$ (0.4192 g/cm$^3$). The catalyst efficiency was 580,000 g PE/g Ti.

D. Polymerization

An aliquot of catalyst, prepared in (1-B) above, containing 0.0099 mmole of titanium was used to polymerize ethylene in the same manner as in (1-C) above, except that 1.1 ml of 0.921 M triethylaluminum (ATE) in hexane was used instead of ATB. The atomic ratio of Al:Ti was 102:1. The dried polyethylene weighed 291 g, had a melt index, $I_2$, of 3.7, an $I_{10}/I_2$ of 9.64 and a bulk density of 25 lb/ft$^3$ (0.4 g/cm$^3$). Catalyst efficiency was 614,000 g PE/g Ti.

E. Catalyst Preparation

The unused portion of catalyst prepared in (1-B) above was heated at 55° C. for 30 minutes (1800 s) while stirring.

F. Polymerization

An aliquot of the catalyst, prepared in (1-E) above, containing 0.0099 mmole of titanium was used to polymerize ethylene in the same manner as in 1-C above. The dried polyethylene weighed 253 g, had a melt index, $I_2$, of 2.1, an $I_{10}/I_2$ of 9.75 and a bulk density of 26.2 lb/ft$^3$ (0.4192 g/cm$^3$). Catalyst efficiency was 534,000 g PE/g Ti.

G. Polymerization

An aliquot of catalyst, prepared in (1-E) above, containing 0.0099 mmole of titanium was used to polymerize ethylene in the same manner as in (1-F) above, except that 1.1 ml of 0.921 M ATE in hexane was used instead of ATB. The dried polyethylene weighed 205 g, had a melt index, $I_2$, of 3.3, an $I_{10}/I_2$ of 9.61 and a bulk density of 23.5 lbs/ft$^3$ (2.376 g/cm$^3$). Catalyst efficiency was 432,000 g PE/g Ti.

H. Catalyst Preparation

To a 75 ml aliquot of the masterbatch, prepared in (1-A) above, containing 25 mmoles of magnesium were added 25 ml of hexane and 1.5 ml of neat tetraisopropoxytitanium. Then, 81.7 ml of 1.53 M ethylaluminum dichloride (EADC) diluted to 100 ml with hexane were added dropwise at 20° C. The volume of the resultant dark brown slurry was adjusted to 200 ml with hexane and an aliquot used to polymerize ethylene. The Mg:Ti atomic ratio of this catalyst was 4.96:1 and the Cl:Mg atomic ratio was 10:1.

I. Polymerization

An aliquot of the catalyst, prepared in (1-H) above, containing 0.0077 mmole of titanium was used to polymerize ethylene in the same manner as in (1-C) above using 2.6 ml of 0.616 M ATB instead of 3.2 ml resulting in an Al:Ti atomic ratio of 208:1. The dried polyethylene weighed 164 g, had a melt index, $I_2$, of 1.1, an $I_{10}/I_2$ of 10.5 and a bulk density of 21.4 lbs/ft$^3$ (0.3424 g/cm$^3$). Catalyst efficiency was 445,000 g PE/g Ti.

J. Catalyst Preparation (Comparative)

To a stirred 75 ml (25 mmoles of Mg) aliquot of the masterbatch solution, prepared in (1-A) above, were added 25 ml of hexane. This was followed by 0.75 ml of tetraisopropyltitanate (2.52 mmoles). Consecutively, 16.3 ml of 1.53 M EADC (24.94 mmoles) were added dropwise at 25° C. Upon complete addition of the aluminum compound, the catalyst slurry, pale yellow green in color, was thermally treated at 65° C. for one hour (3600 s). The final color of the catalyst slurry was olive green. The Mg:Ti and Cl:Mg atomic ratios were 9.9:1 and 2:1 respectively.

K. Polymerization (Comparative)

Ethylene was polymerized according to the method of (1-C) above except that 6.5 ml of 0.616 M ATB (4.004 mmoles) and an aliquot of the catalyst, prepared in (1-J) above, containing 0.04 mmoles Ti were used. The Al:Ti atomic ratio was 100:1. Little ethylene uptake was observed and the reactor contained no solids after two hours (3600 s).

L. Catalyst Preparation

To a stirred 75 ml (25 mmoles of Mg) aliquot of the masterbatch solution, prepared in (1-A) above, were added 1.5 ml of tetra(2-ethylhexoxy)titanium (2.5 mmoles). This was followed by the dropwise addition of 65.4 ml of 1.53 M ethylaluminum dichloride (100.1 mmoles) at ambient temperature over 120 minutes (7200 s). The catalyst slurry was dark grey after complete addition of the ethylaluminum dichloride. The catalyst sat overnight prior to use, and catalyst appearance was a tan-colored slurry. The Cl:Mg atomic ratio was 8:1 and the Mg:Ti atomic ratio was 10:1.

M. Polymerization

Using the same procedure as in example (1-C), except that a 1 liter reactor containing 600 ml of hexane was used, ethylene was polymerized using 1.7 ml of 0.616 M ATB (1.05 mmoles) and an aliquot of catalyst prepared in (1-L) above, containing 0.005 mmoles of titanium were used. The cocatalyst Al:Ti atomic ratio was 210:1. The dried reactor contents weighed 142 g, had a melt index ($I_2$) of 2.39, an $I_{10}/I_2$ of 9.35 and a bulk density of 19.4 lbs/ft$^3$. The catalyst efficiency was 592,000 g PE/g Ti.

EXAMPLE 2

A. Preparation of Reaction Product of Organomagnesium Material and Organic Hydroxyl-containing Material A masterbatch solution was prepared by mixing 148.8 ml of 0.84 M di-n-hexyl magnesium (125 mmoles) and 101.5 ml of 0.616 M ATB (62.5 mmoles). The 32.8 ml of neat n-propyl alcohol (438 mmoles) were added dropwise so as to maintain the temperature at or below about 40° C. The volume of the resultant clear, waterwhite solution was adjusted to 500 ml with hexane. Concentration of magnesium was 0.25 M. The ratio of ROH:R groups contained in (i.e., added ROH to R groups attached to magnesium and aluminum in component A) contained in the masterbatch was 1:1.

B. Catalyst Preparation

To a 100 ml aliquot of masterbatch solution, prepared in (2-A) above, were added 0.37 ml of neat tetraisopropoxytitanium (1.24 mmoles), resulting in a clear, water-white solution. Then 65.4 ml of 1.53 M EADC (100.06 mmoles) were added dropwise at ambient temperature. The catalyst supernatant and the catalyst solids were brown. The Mg:Ti and Cl:Mg atomic ratios were 20.16:1 and 8:1 respectively.

C. Catalyst Preparation

A 100 ml aliquot of the catalyst prepared in (2-B) above was heated for one hour (3600 s) at the boiling point of hexane. Overall catalyst slurry color was a lighter brown, more like tan, than that of the catalyst prepared in (2-B) above. The atomic ratios of Mg:Ti and Cl:Mg were 20.16:1 and 8:1 respectively.

D. Polymerization

An aliquot of catalyst, prepared in (2-B) above, containing 0.002 mmole of titanium was added to a 1 liter stirred reactor containing 600 ml of dry, oxygen-free hexane and 0.6 ml of 0.616 M ATB. The atomic ratio of Al:Ti was 200:1. The polymerization procedure was the same as that employed in Example 1-C. The dried polyethylene weighed 132 g, had a melt index, $I_2$, of 0.46, an $I_{10}/I_2$ of 11.32 and a bulk density of 17.8 lbs/ft$^3$ (0.2848 g/cm$^3$). Catalyst efficiency was 1,375,000 g PE/g Ti.

E. Polymerization

An aliquot of catalyst, prepared in (2-C) above, containing 0.0045 mmoles of titanium was used to polymerize ethylene as in (2-D) above, except that 1.5 ml of 0.616 M ATB was employed. The atomic ratio of Al:Ti was 205:1. The dried polyethylene weighed 258 g, had a melt index, $I_2$, of 1.32, an $I_{10}/I_2$ of 10.7 and a bulk density of 18.8 lbs/ft$^3$ (0.3008 g/cm$^3$/ The catalyst efficiency was 1,200,000 g PE/g Ti.

F. Catalyst Preparation

To a 100 ml aliquot of the masterbatch solution, prepared in (2-A), containing 25 mmoles of magnesium were added 0.75 ml of neat tetraisopropoxytitanium (2.52 mmoles) which resulted in a clear, water-white solution. The 65.4 ml of 1.53 M EADC (100.06 mmoles) were added dropwise at ambient temperature over a period of about one hour (3600 s). The catalyst solids were tan in color. The atomic ratios of Mg:Ti and Cl:Mg were 9.9:1 and 8:1 respectively.

G. Polymerization

Ethylene was polymerized employing the procedure of (2-E) using an aliquot of the catalyst prepared in (2-F) containing 0.0034 mmoles of titanium and 1.1 ml of 0.616 M ATB. The Al:Ti atomic ratio was 200:1. The dried polyethylene weighed 192 g, had a melt index, $I_2$, of 0.8, an $I_{10}/I_2$ of 11.29 and a bulk density of 17.7 lbs/ft$^3$ (0.2832 g/cm$^3$). Catalyst efficiency was 1,176,000 g PE/g Ti.

EXAMPLE 3

A. Preparation of Reaction Product of Organomagnesium Material and Organic Hydroxyl-containing Material A masterbatch solution was prepared by mixing 235.5 ml of 0.637 M butylethyl magnesium (150 mmoles) and 121.8 ml of 0.616 M ATB (75 mmoles). Then 39.2 ml of neat n-propyl alcohol (524 mmoles) were added dropwise so as to maintain the temperature at about 40° C. The soluble reaction product was diluted to 570 ml with hexane. The magnesium concentration was 0.2632 M. The ratio of ROH:R groups contained in (i.e., added ROH to R groups attached to magnesium and aluminum in component A) contained in the masterbatch was 1:1.

B. Catalyst Preparation

To a stirred 95 ml aliquot of the masterbatch solution prepared in (3-A) containing 25 mmoles of magnesium were added 0.74 ml of neat tetraisopropoxytitanium (2.49 mmoles) resulting in a clear, water-white solution. Then 65.4 ml of 1.53 M EADC (100.1 mmoles) were added dropwise at ambient temperature over one hour (3600 s). The color of the catalyst solids was gray and the supernatant was a very light brown. The Mg:Ti and Cl:Mg atomic ratios were 10:1 and 8:1 respectively.

C. Polymerization

Ethylene was polymerized in a 2.5 ml reactor employing the procedure of example (1-C), except that the reactor was pressured to 50 psig (345 kPa) with hydrogen. An aliquot of catalyst, prepared in (3-B), containing 0.0041 mmole of titanium and 1.3 ml of 0.616 M ATB were used. The atomic ratio of Al:Ti was 200:1. The dried polyethylene weighed 369 g, had a melt index, $I_2$, of 0.65, an $I_{10}/I_2$ of 10.52 and a bulk density of 20.5 lbs/ft$^3$ (0.328 g/cm$^3$). Catalyst efficiency was 1,879,000 g PE/g Ti.

D. Catalyst Preparation

To a stirred 95 ml aliquot of the masterbatch solution, prepared in (3-A), containing 25 mmoles of magnesium were added 50 ml of hexane and 0.3 ml of neat titanium tetrachloride (2.73 mmoles) dissolved in 3 ml of hexane. A fine white precipitate appeared. Then 65.4 ml of 1.53 M EADC (100.06 mmoles) were added dropwise over a one hour (3600 s) period at ambient temperature. A catalyst with gray solids and a dark brown supernatant resulted. The Mg:Ti and Cl:Mg atomic ratios were 9.2:1 and 8:1 respectively.

E. Polymerization

Ethylene was polymerized in a 1 liter reactor employing the procedure of example (1-C), except that the reactor was pressured to 75 psig (517 kPa) with hydrogen prior to introducing the ethylene. An aliquot of the catalyst, prepared in (3-D), containing 0.003 mmoles of titanium and 1 ml of 0.616 M ATB were used. The Al:Ti atomic ratio was 205:1. The dried polyethylene weighted 90 g, had a melt index, $I_2$, of 0.53, an $I_{10}/I_2$ of 10.85 and a bulk density of 19.7 lbs/ft$^3$ (0.3152 g/cm$^3$). Catalyst efficiency was 625,000 g PE/g Ti.

F. Catalyst Preparation

To a stirred 95 ml aliquot of masterbatch solution (3-A) containing 25 mmoles of magnesium were added 0.75 ml of neat tetraisopropoxytitanium (2.52 mmoles) resulting in a clear, water-white solution. Then 32.7 ml of 1.53 M EADC (50.03 mmoles) and 68.5 ml of 1.46 M diethylaluminum chloride, DEAC, (100 mmoles) were added sequentially. Addition of each reducing halide was dropwise at 25° C. and each halide was added at a rate of ~1 ml/min (1 ml/60 s). The catalyst solids were dark green-gray and the supernatant essentially colorless after sitting over 24 hours (86400 s). The Mg:Ti and Cl:Mg atomic ratios were 9.9:1 and 8:1 respectively.

G. Polymerization

Ethylene was polymerized in a 1 liter reactor employing the procedure of (3-E). An aliquot of catalyst solution, prepared in (3-F) containing 0.003 mmole titanium and 1 ml of 0.616 M ATB were used. The dried polyethylene weighed 181 g, had a melt index, $I_2$, of 1.83, an $I_{10}/I_2$ of 10.48 and a bulk density of 22.7 lbs/ft$^3$ (0.3632 g/cm$^3$). Catalyst efficiency was 1,257,000 g PE/g Ti.

H. Catalyst Preparation

To a stirred 95 ml aliquot of the masterbatch solution, prepared in (3-A), containing 25 mmoles of magnesium were added sequentially, 0.75 ml of neat tetraisopropoxytitanium (2.52 mmoles), 68.5 ml of 1.46 M DEAC (100 mmoles) and 32.7 ml of 1.53 M EADC (100.06 mmoles). The final catalyst slurry was purplish-gray in color. The Mg:Ti and Cl:Mg atomic ratios were 9.9:1 and 8:1 respectively.

I. Polymerization

Ethylene was polymerized employing the procedure of (3-G), except that an aliquot of catalyst prepared in (3-H) containing 0.003 mmole titanium and 1.0 ml of 0.616 M ATB were used. The Al:Ti ratio was 200:1. The dried polyethylene weighed 207 g, had a melt index, $I_2$, of 2.81, an $I_{10}/I_2$ of 8.8 and a bulk density of 19.4 lbs/ft$^3$ (0.3104 g/cm$^3$). Catalyst efficiency was 1,438,000 g PE/g Ti.

J. Polymerization

An aliquot of catalyst prepared in example (3-B) above, containing 0.003 millimoles of titanium and 1.0 ml of 0.616 M triisobutyl aluminum (0.616 mmoles) were used to polymerize ethylene in a manner similar to that employed in (2-D). The cocatalyst to titanium Al:Ti atomic ratio was 208:1. The dried polyethylene weighed 181 g, had a melt index, $I_2$, of 1.76, an $I_{10}/I_2$ of 10.79, and a bulk density of 23.1 lb/ft$^3$ (0.37 g/cm$^3$). The catalyst efficiency was 1,257,000 g PE/g Ti.

ETHYLENE-HEXENE COPOLYMER

K. Polymerization

An aliquot of catalyst prepared in example (3-B) above containing 0.004 millimoles of titanium was added to a 1.0 liter stirred stainless reactor containing 0.40 liter of dry, oxygen free hexane and 1.95 ml of 0.616 M triisobutylaluminum (1.20 mmoles) in hexane. The atomic ratio of Al:Ti for the cocatalyst was 300:1. The reactor nitrogen atmosphere was replaced with hydrogen by purging, the reactor contents were heated to 63° C., and the reactor pressure was adjusted to 30 psig (207 kPa) with hydrogen. Next, 200 ml of 1-hexene which was preheated to about 60° C., was sidestreamed into the reactor, along with ethylene. The total volume of the hexene and hexane was 0.60 liters. Ethylene was then added on demand so as to maintain a reactor pressure of 170 psig (1172 kPa). After two hours (7200 s) the reactor was cooled to room temperature and vented. The reactor seal was broken and the contents were filtered, washed with hexane, air-dried and then dried under vacuum at about 70° C. The yield of the dried ethylene-hexene copolymer was 187 grams and had a melt index, $I_2$, of 0.61, an $I_{10}/I_2$ of 9.41, and a bulk density of 16.1 lbs/ft$^3$ (0.258 g/cm$^3$). The catalyst efficiency was 974,000 g PE/g Ti. The unannealed density of the copolymer was determined by the method described in ASTM D-792, and was found to be 0.9346 g/cm$^3$.

EXAMPLE 4

A. Preparation of Reaction Product of Organomagnesium Material and Organic Hydroxyl-containing Material A masterbatch solution was prepared by mixing 393.7 ml of 0.381 M di-n-hexyl magnesium (150 mmoles) with 121.8 ml of 0.616 M ATB (75 mmoles). Then 39.5 ml of neat n-propyl alcohol (528.5 mmoles) were added dropwise so as to maintain the temperature at about 40° C. The ratio of ROH:R groups (i.e., added ROH to R groups attached to magnesium and aluminum in component A) contained in the masterbatch was 1:1.

B. Catalyst Preparation

To a stirred 100 ml aliquot of the masterbatch solution, prepared in (4-A), containing 25 mmoles of magnesium were added 0.74 ml of neat tetraisopropoxytitanium (2.49 mmoles), followed by the dropwise addition of 130.8 ml of 1.53 M EADC (200.12 mmoles) at 28° C. over 2 hours (7200 s). The final catalyst slurry was purplish-red in color. The atomic ratios of Mg:Ti and Cl:Mg were 10:1 to 16:1 respectively.

C. Polymerization

Ethylene was polymerized employing the procedure of example (2-D). An aliquot of the catalyst, prepared in (4-B), containing 0.0039 mmole of titanium and 1.3 ml of 0.616 M ATB in hexane were used. The atomic ratio of Al:Ti was 200:1. The dried polyethylene weighed 158 g, had a melt index, $I_2$, of 0.52, an $I_{10}/I_2$ of 11.04 and a bulk density of 15.6 lbs/ft$^3$ (0.2496 g/cm$^3$). Catalyst efficiency was 823,000 g PE/g Ti.

EXAMPLE 5

A. Catalyst Preparation

While stirring, 78.5 ml of 0.637 M butylethyl magnesium (250 mmoles) and 40.6 ml of 0.616 M ATB (25 mmoles) in hexane were mixed in a 500 ml flask. Then 10.5 ml of neat n-propyl alcohol (140.5 mmoles) were added dropwise to maintain the temperature at or near 40° C. The ratio of ROH:R (i.e., R groups attached to magnesium and aluminum in component A) was 0.8:1. Then 1.5 ml of neat tetraisopropoxytitanium (5.04 mmoles) were added, resulting in a clear, water-white solution. Finally, 130.8 ml of 1.53 M EADC (200.1 mmoles) were added dropwise at 30° C. over a 2 hour (7200 s) period. After stirring for an additional hour (3600 s) a gray-tan slurry resulted. The Mg:Ti and Cl:Mg atomic ratios were 10:1 and 8:1 respectively.

B. Polymerization

Ethylene was polymerized in a 2.5 liter reactor employing the procedure of example (1-C) using 1.1 ml of 0.616 M ATB and an aliquot of catalyst, prepared in (5-A), containing 0.0034 mmoles of titanium. The atomic ratio of Al:Ti was 200:1. The total reactor pressure was adjusted to 55 psig (379.2 kPa) with hydrogen prior to introducing the ethylene. The dried polyethylene weighed 321 g, had a melt index, $I_2$, of 0.45, an $I_{10}/I_2$ of 11.11 and a bulk density of 20.9 lbs/ft$^3$ (0.3344 g/cm$^3$). Catalyst efficiency was 1,955,000 g PE/g Ti.

C. Catalyst Preparation

A catalyst was prepared by the same procedure as in example (5-A) except that the ROH:R ratio was 1.1:1. Components used were 78.5 ml of 0.637 M butylethyl magnesium (50 mmoles), 40.6 ml of 0.616 M ATB (25 mmoles), 13.3 ml of neat n-propyl alcohol (178 moles), 1.5 ml of neat tetraisopropoxytitanium (5.04 mmoles) and 130.8 ml of 1.53 M EADC (200.1 mmoles). The final catalyst slurry was gray. The Mg:Ti and Cl:Mg atomic ratios were 10:1 and 8:1 respectively.

D. Polymerization

Ethylene was polymerized employing the procedure of example (5-B). An aliquot of catalyst, prepared in (5-C), containing 0.00297 mmoles of titanium, 1 ml of 0.616 M ATB. The cocatalyst Al:Ti atomic ratio was 207:1. The pressure was adjusted to 60 psig (413.7 kPa) with hydrogen prior to introducing ethylene. The dried polyethylene weighed 244 g, had a melt index, $I_2$, of 1.9, an $I_{10}/I_2$ of 9.54 and a bulk density of 21.4 lbs/ft$^3$ (0.3424 g/cm$^3$). Catalyst efficiency was 1,715,000 g PE/g Ti.

EXAMPLE 6

A. Catalyst Preparation

To a stirred 17 ml of dry Isopar ® E, an isoparaffinic mixture having a boiling range of 116°–134° C., were added sequentially, 2.3 ml of 0.174 M butylethyl magnesium (0.4 mmole), 0.3 ml of 0.616 M ATB (0.185 mmole) in hexane, 1.05 ml of 1.33 M n-propyl alcohol (1.4 mmoles) in Isopar ® E, 2.4 ml of 0.0336 M tetraisopropoxytitanium (0.081 mmole) in Isopar ® E and 7.1 ml of 0.225 M EADC (1.6 mmoles). A tan colored slurry was formed and the slurry volume was adjusted to 100 ml with Isopart ® E. The ratio of ROH:R (i.e., total amount of alcohol per R groups attached to magnesium and aluminum in component A) of the hydroxyl-containing solution prior to addition of the titanium species was 1.03:1.0. The Mg:Ti and Cl:Mg atomic ratios were 5:1 and 8:1 respectively.

B. Catalyst Preparation

The procedure of (6-A) was repeated except that 0.6 ml of 0.0336 M tetraisopropoxytitanium (0.02 mmole) was used. A tan slurry formed. The Mg:Ti and Cl:Mg atomic ratios were 20:1 and 8:1 respectively.

C. Polymerization

To a stirred 1-gallon (3.79 l) stainless steel reactor containing 2 liters of dry, oxygen-free Isopar ® E were added 2.2 ml of 0.0930 M TEA (triethylaluminum) (0.2 mmole). The reactor was vented to 0 psig (0 kPa), and the pressure adjusted to 3 psig (20.68 kPa) with hydrogen. The reactor contents were heated to 150° C. Ethylene was added to the reactor at 400 psig (2757.9 kPa), then an aliquot of catalyst, prepared in (6-A), containing 0.002 mmole of titanium was pressured into the reactor. The pressure was maintained at 400 psig (2757.9 kPa) by ethylene flow for 20 minutes (1200 s). The sample was collected and the Isopar ® E was flashed off under vacuum at 80° C. The dried polyethylene weighed 39 g and had a melt index, $I_2$, of 1.18 and an $I_{10}/I_2$ of 8.8. Catalyst efficiency was 406,000 g PE/g Ti.

D. Polymerization

Ethylene was polymerized employing the procedure of (6-C) except that an aliquot of the catalyst of (6-B) containing 0.002 mmole of titanium was employed. The polyethylene yield was 93 g and the melt index, $I_2$, was 2.84 and an $I_{10}/I_2$ of 7.5. The catalyst efficiency was 1,020,000 g PE/g Ti.

EXAMPLE 7

A. Catalyst Preparation

A solution (41.2 lbs/18.7 kg) of dibutylmagnesium in heptane containing 1.98% magnesium and a solution (18.8 lbs/8.5 kg) of 17% ATB in hexane were mixed in a stirred, jacketed 50-gallon (189.27 l) reactor. Cooling was applied to the vessel jacket and n-propyl alcohol (6.4 lbs/1.9 kg) was added at a rate such that the temperature of the reactor contents did not rise above 40° C. With the reactor contents at 20° C., 447 ml of tetraisopropoxytitanium diluted to 800 ml with hexane were added to the reactor. The reactor contents were maintained at 20°-24° C. while a solution (72.2 lbs/32.7 kg) of 25% EADC in hexane was added at a rate of 0.3 lb/hr (0.0378 g/s). The resultant grayish-tan slurry was stirred for 16 hours (57600 s). The Mg:Ti and Cl:Mg atomic ratios were 10:1 and 9:1 respectively.

B. Polymerization

The catalyst prepared in (7-A) was diluted to a concentration of 0.01 mmolar based on titanium with dry, oxygen-free hexane. This diluted catalyst was added at the rate of 7.1–12.4 parts by weight (pbw) per hour (0.00197–0.00344 pbw/s) to a partially full agitated reactor. Simultaneously, 100 pbw of ethylene per hour (0.0278 pbw per s) and 426 pbw of hexane per hour (0.118 per s) were added to the reactor while the reactor pressure and temperature were controlled at 170 psig (1172 kPa) and 85° C. respectively. A 3 weight percent solution of ATB in hexane was added at a rate so as to give an Al:Ti atomic ratio of about 80:1 in the reactor. Hydrogen was added to the gaseous phase of the reactor so as to obtain the desired polymer melt index. The reactor contents were continuously removed, the polymer and hexane separated and the dried polymer collected. The polymer powder collected had a melt index, $I_2$, of 1.2, and a bulk density of 22.9 lbs/ft³ (0.3664 g/cm³). The final dried polymer powder was melted, extruded, and pelletized. The pellets had a melt index, $I_2$, of 1.52 and an $I_{10}/I_2$ of 10.2. The catalyst efficiency was 1,750,000 g PE/g Ti.

C. Polymerization

To a stirred 2.5 liter stainless steel reactor was added 1.5 liters of dry, oxygen-free hexane and 1.0 ml of 0.616 M triisobutylaluminum (0.616 mmoles). Next, an aliquot of the catalyst prepared in (7-A) above containing 0.03 mmoles of titanium was added to the reactor. The atomic ratio of Al:Ti was 208:1. The reactor was sealed, purged with hydrogen and heated to 85° C. Hydrogen was then added so that the reactor pressure was 65 psig (448 kPa). Ethylene was then used to maintain a reactor pressure of 170 psig (1172 kPa). After 2 hours (7200 s) the reactor was cooled to room temperature and vented. The reactor seal was broken and the contents were treated in a manner similar to that described in (1-C) above. The dried polyethylene weighed 362 grams, had a melt index, $I_2$, of 1.27, an $I_{10}/I_2$ of 10.58 and a bulk density of 15.6 lbs/ft³ (0.25 g/cm³). The catalyst efficiency was 2,514,000 g PE/g Ti.

EXAMPLE 8

A. Catalyst Preparation

To 100 ml of 0.769 M dibutylmagnesium (76.9 mmoles) were added 62 ml of 0.616 M trisobutylaluminum (38.2 millimoles). Then while stirring, 29.1 ml of 2-pentanol (268.6 mmoles) were added dropwise so as to maintain temperature at about 40° C. The final clear, colorless solution volume was adjusted to 300 ml with hexane. To a 150 ml aliquot of this solution were added 2.17 ml of isopropyltitanate decamer (Nippon Soda) (3.8 millimoles) resulting still in a clear, colorless solution. Then 100.0 ml of 1.53 M ethylaluminum dichloride (153 mmoles) were added dropwise at room temperature, resulting in a grey catalyst slurry. The catalyst slurry was stirred gently for sixteen hours (57600 s) prior to use. The Cl:Mg atomic ratio was 8:1 and the Mg:Ti atomic ratio was 10:1. The ratio of ROH:R groups (i.e., alcohol to R groups attached to magnesium and aluminum in component A) was 1:1.

B. Polymerization

In the same manner as example (2-D), ethylene was polymerized using 1.9 ml of 0.616 M ATB (1.17 mmoles) and an aliquot of catalyst (8-A) prepared above containing 0.004 millimoles of titanium. The atomic ratio of cocatalyst Al:Ti was 295:1. The dried polyethylene weighed 142 g, had a melt index, $I_2$, of 1.5, an $I_{10}/I_2$ of 9.44 and a bulk density of 21.1 lbs/ft³. Catalyst efficiency was 740,000 g PE/g Ti.

C. Polymerization

In a manner similar to example (2-D), ethylene was polymerized using 1.95 ml of 0.616 M triisobutylaluminum (1.20 mmoles) and an aliquot of catalyst (8-A) prepared above containing 0.004 millimoles of titanium. The atomic ratio of the cocatalyst Al:Ti was 300:1. The reactor pressure was adjusted to 50 psig (345 kPa) with hydrogen prior to adding ethylene, instead of 70 psig (483 kPa) as in (2-D) above. The dried polyethylene weighed 215 g, had a melt index, $I_2$, of 0.48, an $I_{10}/I_2$ of 9.46, and a bulk density of 21.0 lbs/ft³ (0.336 g/cm³). Catalyst efficiency was 1,129,600 g PE/g Ti.

EXAMPLE 9

A. Catalyst Preparation

To 28.4 ml of 0.88 M butyloctylmagnesium (25.0 mmoles) was added 20.3 ml of 0.616 M ATB (12.5 mmoles). While stirring, 13.8 ml of n-octyl alcohol (87.6 mmoles) were added dropwise at a rate to maintain temperature at 40° C. To the clear, colorless solution which formed was added 0.74 ml of tetraisopropoxytitanium (2.5 mmoles), resulting in no change in the solution appearance. Then 71.4 ml of 1.53 M ethylaluminum dichloride (109.2 mmoles) were added dropwise over about two hours (7200 s) at ambient temperature. A brown slurry resulted. The Cl:Mg atomic ratio was 8.7:1.0 and the Mg:Ti atomic ratio was 10:1. The ratio of ROH:R groups (i.e., alcohol to R groups attached to magnesium and aluminum in component A) was 1:1.

B. Polymerization

In the manner of example (2-D), ethylene was polymerized using 1.7 ml of 0.616 M ATB (1.05 mmoles) and an aliquot of catalyst (9-A) containing 0.0049 mmoles titanium. The cocatalyst Al:Ti atomic ratio employed was 212:1. The dried reactor contents weighed 142 g, had a melt index, $I_2$, of 1.15, an $I_{10}/I_2$ of 10.49, and a bulk density of 21.3 lbs/ft$^3$. Catalyst efficiency was 599,000 g PE/g Ti.

EXAMPLE 10

A. Catalyst Preparation

To 39.3 ml of 0.637 M butylethylmagnesium (25.0 mmoles) was added 20.3 ml of 0.616 M ATB (12.5 mmoles). While stirring, 6.5 ml of n-propyl alcohol (86.8 mmoles) were added dropwise so as to maintain temperature of about 60° C. To the clear, colorless solution which formed was added 0.86 ml of neat tetra-n-butoxytitanium (2.5 mmoles). The solution remained clear and colorless. Then 102.0 ml of 1.47 M ethylaluminumsesquichloride (149.9 mmoles) were added dropwise at ambient temperature over about two hours. After addition of the ethylaluminumsesquichloride the catalyst slurry had an olive-green appearance: a greenish-gold supernatant and grey solids. The Cl:Mg atomic ratio was 9:1 and the Mg:Ti atomic ratio was 10:1. The ratio of ROH:R groups (i.e., alcohol to R groups attached to magnesium and aluminum in component A) was 0.99:1.

B. Polymerization

In the same manner as example (2-D), ethylene was polymerized using 1.7 ml of 0.616 M ATB (1.05 mmoles) and an aliquot of catalyst (10-A) containing 0.005 millimoles titanium. The cocatalyst Al:Ti atomic ratio employed was 210:1. The dried reactor contents weighed 245 g, had a melt index, $I_2$, of 1.27, an $I_{10}/I_2$ of 10.32 and a bulk density of 20.6 lbs/ft$^3$. Catalyst efficiency was 1,013,000 g PE/g Ti.

EXAMPLE 11

A. Catalyst Preparation

In a nitrogen filled glove box, 100 ml of 0.637 M butylethylaluminum, BEM, (64 mmoles), and 53 ml of 0.616 M triisobutylaluminum, ATB, (33 mmoles), were added to a 500 ml fleaker. Next 17.3 ml of 13.38 M n-propyl alcohol (231 mmoles) was added dropwise so as to maintain the temperature at about 40° C. resulting in a colorless solution. The ratio of OR:R groups was 1:1. Next, 1.9 ml of 3.36 M tetraisopropyltitanate (6.4 mmoles) was added. The solution remained clear and colorless. The solution was heated to the boiling point of hexane (about 65° C.) and 90 ml of 1.53 M ethylaluminum dichloride (138 mmoles) was added. The resulting white slurry was divided into two equal portions. To one portion, an additional 45 ml of 1.53 M ethylaluminum dichloride (69 mmoles) was added while the solution was heated to the boiling point of hexane. The resulting grey-white catalyst slurry had Mg:Ti and Cl:Mg atomic ratios of 10:1 and 8:1, respectively.

B. Polymerization

An aliquot of catalyst prepared in (11-A) above containing 0.004 millimoles of titanium was added to a 1.0 liter stirred reactor containing 600 ml of dry, oxygen free hexane and 1.3 ml of 0.616 M triisobutylaluminum (0.80 mmoles). The atomic ratio of Al:Ti was 200:1. The reactor nitrogen atmosphere was replaced with hydrogen by purging, the reactor contents were heated to 85° C., and the reactor pressure was adjusted to 70 psig (483 kPa) with hydrogen. Ethylene was added to maintain a reactor pressure of 170 psig (1172 kPa). After two hours at 85° C., the reactor was cooled to room temperature and vented. The reactor seal was broken and the contents were filtered, air-dried and then dried under vacuum at about 70° C. The dried polyethylene powder weighed 209 grams, had a melt index, $I_2$, of 2.60, an $I_{10}/I_2$ of 9.40, and a bulk density of 21.4 lbs/ft$^3$ (0.342 g/cm$^3$). The catalyst efficiency was 1,088,500 g PE/g Ti.

EXAMPLE 12

A. Catalyst Preparation

A solution (27.0 lbs) of dibutylmagnesium in heptane containing 10.9% by weight dibutylmagnesium (10.0 moles) and a solution (12.5 lbs) of triisobutylaluminum in hexane containing 18% by weight triisobutylaluminum (5.0 moles) were mixed in a stirred, jacketed 50 gallon reactor. While cooling the vessel, 4.6 pounds of 13.38 M n-propyl alcohol (35.0 moles) was added at a rate such that the temperature of the reactor contents did not rise above 40° C. With the reactor contents at 20° C., 298 ml of 3.36 M tetraisopropyltitanate (1.0 moles) diluted to 800 ml with hexane were added to the reactor. Next, 59.5 pounds of a 25% by weight ethylaluminum dichloride (55 moles) solution in hexane was added at a rate of 0.4 to 0.8 pounds/minute and at a temperature of 23 to 30° C. The resulting greenish solid was stirred for 20 hours (72000 s) at 30° C. prior to use. The Mg:Ti and Cl:Mg atomic ratios were 10:1 and 11:1, respectively.

B. Polymerization

Ethylene was polymerized in a similar manner as Example (1-C). To a stirred 2.5 liter autoclave was added 1.5 liters of dry, oxygen-free hexane. While maintaining a small nitrogen purge, 1.0 ml of 0.616 M triisobutylaluminum (0.60 mmoles) and an aliquot of catalyst (12-A) prepared above containing 0.03 millimoles of titanium were added. The Al:Ti atomic ratio for the cocatalyst was 200:1. The reactor was sealed, purged with hydrogen and heated to 85° C. Hydrogen was then added so that the reactor pressure was 65 psig (448 kPa). Ethylene was employed to maintain a reactor pressure of 170 psig (1172 kPa). After 2 hours (7200 s) the reactor was cooled to room temperature and vented. The reactor seal was broken and the contents were filtered, air-dried, and then dried under vacuum at about 70° C. The yield of dried polyethylene was 274 grams and had a melt index, $I_2$, of 0.61, an $I_{10}/I_2$ of 11.09, and a bulk density of 17.5 lbs/ft$^3$ (0.28 g/cm$^3$). The catalyst efficiency was 1,903,000 g PE/g Ti.

C. Polymerization

Ethylene was polymerized in a similar manner as Example (2-D). To a stirred 1.0 liter autoclave was added 0.6 liter of dry, oxygen-free hexane. While maintaining a small nitrogen purge, 1.25 ml of 0.616 M triisobutylaluminum (0.77 mmole) and an aliquot of catalyst prepared in (12-A) above containing 0.0026 millimoles of titanium were added. The Al:Ti atomic ratio for the cocatalyst was 300:1. The reactor was sealed, purged with hydrogen and heated to 85° C. Hydrogen was then added so that the reactor pressure was 70 psig (483 kPa). Ethylene was employed to maintain a reactor pressure of 170 psig (1172 kPa). After 2 hours (7200 s) the reactor was cooled to room temperature and vented. The reactor seal was broken and the contents were filtered, air-dried, and then dried under vacuum at about 70° C. The yield of dried polyethylene was 220 grams and had a melt index, $I_2$, of 0.89, an $I_{10}/I_2$ of 11.39, and a bulk density of 18.4 lbs/ft$^3$ (0.294 g/cm$^3$). The catalyst efficiency was 1,786,900 g PE/g Ti.

ETHYLENE-HEXENE COPOLYMER

D. Polymerization

As in example (3-K), an aliquot of catalyst prepared in (12-A) above containing 0.003 millimoles of titanium was added to a 1.0 liter stirred stainless reactor containing 0.50 liter of dry, oxygen free hexane and 1.47 ml of 0.616 M triisobutylaluminum (0.90 mmoles) in hexane. The atomic ratio of Al:Ti for the cocatalyst was 300:1. The reactor nitrogen atmosphere was replaced with hydrogen by purging, the reactor contents were heated to 73° C., and the reactor pressure was adjusted to 35 psig (241 kPa) with hydrogen. Next, 100 ml of 1-hexene which was preheated to about 70° C., was sidestreamed into the reactor, along with ethylene. The total volume of the hexene and hexane was 0.60 liters. Ethylene was then added on demand so as to maintain a reactor pressure of 140 psig (965 kPa). After two hours (7200 s) the reactor was cooled to room temperature and vented. The reactor seal was broken and the contents were filtered, washed with hexane, air-dried and then dried under vacuum at about 70° C. The yield of the dried ethylene-hexene copolymer was 167 grams and had a melt index, $I_2$, of 0.98, an $I_{10}/I_2$ of 9.55, and a bulk density of 13.9 lbs/ft$^3$ (0.258 g/cm$^3$). The catalyst efficiency was 1,159,000 g PE/g Ti. The unannealed density of the copolymer was determined by the method described in ASTM D-792, and was found to be 0.9386 g/cm$^3$.

ULTRA HIGH MOLECULAR WEIGHT ETHYLENE-OCTENE COPOLYMER

E. Polymerization

An aliquot of catalyst prepared in (12-A) above containing 0.0013 millimoles of titanium was added to a 1.0 liter stirred stainless reactor containing 0.54 liter of dry, oxygen-free hexane and 1.0 ml of 0.616 M triisobutylaluminum (0.616 mmoles) in hexane. The atomic ratio of Al:Ti for the cocatalyst was 478:1. The reactor was vented to 0 psig (0 kPa) and the reactor contents were heated to 73° C. No hydrogen was added to control the melt index. Next, 60 ml of 1-octene which was preheated to about 70° C., was sidestreamed into the reactor, along with ethylene. The total volume of the octene and hexane was 0.60 liters. Ethylene was then added on demand so as to maintain a reactor pressure of 170 psig (1172 kPa). After two hours (7200 s) the reactor was cooled to room temperature and vented. The reactor seal was broken and the contents were filtered, washed with hexane, air-dried and then dried under vacuum at about 70° C. The yield of the dried ethylene-octene copolymer was 273 grams and had a melt index too low to measure and a bulk density of 21.0 lbs/ft$^3$ (0.336 g/cm$^3$). *The catalyst efficiency was* 4,408,900 g PE/g Ti. The unannealed density of the copolymer was determined by the method described in ASTM D-792, and was found to be 0.9291 g/cm$^3$.

EXAMPLE 13

A. Catalyst Preparation

While stirring, 29.6 ml of 0.63 M butylethyl magnesium (25.0 mmoles) and 27.3 ml of 0.921 M triethylaluminum (25.0 mmoles) in hexane were mixed in a 300 ml flask. Next, a solution of 6.54 ml of 13.38 M n-propyl alcohol (87.5 mmoles) and 20 ml of hexane were added dropwise to maintain the temperature at about 40° C. The ratio of ROH:R groups was 0.7:1.0. Then 0.74 ml of 1.68 M tetraisopropyltitanate (1.25 mmoles) were added, resulting in a solution having a slight green tint. To the solution was added 113.6 ml of 1.53 M ethylaluminum dichloride (175 mmoles) dropwise at about 30° C. over a one hour (3600 s) period. The catalyst was stirred for several hours, resulting in an olive green slurry. The Mg:Ti and Cl:Mg atomic ratios were 10:1 and 14:1, respectively.

B. Polymerization

Ethylene was polymerized in a 2.5 liter reactor employing the procedure of Example (1-C) above, using 2.3 ml of 0.616 M triisobutylaluminum (0.80 mmoles) and an aliquot of catalyst prepared in (13-A), containing 0.04 mmoles of titanium. The cocatalyst to titanium atomic ratio, Al:Ti, was 200:1. The dried polyethylene weighed 379 g, had a melt index, $I_2$, of 1.35, an $I_{10}/I_2$ of 11.00, and a bulk density of 18.7 lbs/ft$^3$ (0.299 g/cm$^3$). The catalyst efficiency was 1,973,960 g PE/g Ti.

EXAMPLE 14

A. Catalyst Preparation

To a stirred solution consisting of 39.3 ml of 0.637 M butylethylmagnesium, BEM, (25.0 mmoles) and 20.3 ml of 0.616 M triisobutylaluminum, ATB, (12.5 mmoles), was added dropwise 3.3 ml of 13.38 M normal propyl alcohol (44 mmoles). The solution remained clear and colorless. The ROH:R atomic ratio was 0.5:1. Next, 1.5 ml of 1.68 M tetraisopropyltitanate (2.5 mmoles) was added. An opaque brown solution resulted. Then 64.9 ml of 1.54 M ethylaluminum dichloride (100 mmoles) was added dropwise at room temperature over a one hour period. The resulting opaque slurry was stirred for 17 hours prior to use. The Mg:Ti atomic ratio was 10:1 and the Cl:Mg atomic ratio was 8:1.

B. Polymerization

To a stirred 1.8 lirer reactor containing 1.0 liter of dry, oxygen-free hexane were added 3.2 ml of 0.616 M triisobutylaluminum (2.0 mmoles) and an aliquot of catalyst prepared in (14-A) above containing 0.010 mmole titanium. The Al:Ti atomic ratio for the cocatalyst was 200:1. The reactor was padded with hydrogen and then heated to 85° C. The pressure was adjusted to 70 psig (482 kPa) with hydrogen and then ethylene was introduced into the reactor. Reactor pressure was maintained at 170 psig (1172.1 kPa) total by ethylene on demand for two hours (7200 s). The reactor was cooled to room temperature and vented. The reactor seal was then broken and the contents were removed, filtered and dried under vacuum. The dried polyethylene weighed 183 g, had a melt index, $I_2$, of 1.02, an $I_{10}/I_2$ of 10.1, and a bulk density of 23.7 lb/ft$^3$ (0.380 g/cm$^3$). The catalyst efficiency was 387,450 lb PE/lb Ti.

EXAMPLE 15

A. Catalyst Preparation

To a stirred solution consisting of 39.3 ml of 0.537 M butylethylmagensium, BEM, (25.0 mmoles) and 20.3 ml of 0.616 M triisobutylaluminum, ATB, (12.5 mmoles), was added dropwise 4.6 ml of 13.38 M normal propyl alcohol (61.5 mmoles). The solution remained clear and colorless. The ROH:R atomic ratio was 0.7:1. Next, 1.5 ml of 1.68 M tetraisopropyltitanate (2.5 mmoles) was added. The solution remained clear and colorless. Then 64.9 ml of 1.54 M ethylaluminum dichloride (100 mmoles) was added dropwise at room temperature over a 0.6 hour (2160 s) period. The resulting tannish brown slurry was stirred for 18 hours (64800 s) prior to use. The Mg:Ti atomic ratio was 10:1 and the Cl:Mg atomic ratio was 8:1.

B. Polymerization

An aliquot of catalyst prepared in (15-A) above, containing 0.005 mmole of titanium and 1.6 ml of 0.616 M triisobutylaluminum (0.99 mmoles) were used to polymerize ethylene in the same manner as in Example (14-B) of the above. The Al:Ti atomic ratio for the cocatalyst was 200:1. The dried polyethylene weighed 241 g, had a melt index, $I_2$, of 1.23, an $I_{10}/I_2$ of 9.71, and a bulk density of 18.6 lb/ft$^3$ (0.298 g/cc). The catalyst efficiency was 1,028,860 g PE/g Ti.

EXAMPLE 16

A. Catalyst Preparation

To a stirred solution consisting of 39.7 ml of 0.630 M butylethylmagnesium, BEM, (25.0 mmoles) and 27.1 ml of 0.921 M triethylaluminum, ATE, (25.0 mmoles), was added dropwise 6.54 ml of 13.38 M n-propyl alcohol (87.5 mmoles). The solution remained clear and colorless. The ROH:R atomic ratio was 0.7:1.0. Next, 122.6 ml of 1.54 M ethylaluminum dichloride (187 mmoles) were added dropwise at room temperature over a one hour period. To the resulting white slurry was added 0.74 ml of 1.68 M tetraisopropyltitanate (1.25 mmoles). The catalyst was stirred for 17 hours (61200 s) prior to use. The final catalyst slurry color was a reddish brown. The Mg:Ti atomic ratio was 20:1 and the Cl:Mg atomic ratio was 15:1.

B. Polymerization

An aliquot of catalyst prepared in Example (16-A) above, containing 0.004 mmoles of titanium was used to polymerize ethylene in the same manner employed in Example (1-C), except that 1.3 ml of 0.616 M triisobutylaluminum (0.80 mmoles) was used. The cocatalyst to titanium atomic ratio of Al:Ti was 200:1. The dried polyethylene weighed 237 g, had a melt index, $I_2$, of 1.00, an $I_{10}/I_2$ of 9.65, and a bulk density of 16.8 lb/ft$^3$ (0.2691 g/cm$^3$). The catalyst efficiency was 1,234,400 g PE/g Ti.

EXAMPLE 17

A. Catalyst Preparation

A solution (391 lbs) of a butylethylmagnesium (190 moles) in hexane containing 2.6% by weight magnesium and a solution (172 lbs, 78 kg) of 24.2% by weight triisobutylaluminum (95 moles) in hexane were mixed in a stirred, jacketed 400 gallon reactor. Next, 88 pounds (39.9 kg) of 13.38 M n-propyl alcohol (665 moles) was added. Cooling was applied during the alcohol addition so as to maintain a temperature below 40° C. With the reactor contents at 15° C., 24.0 pounds (10.9 kg) of a 50% by weight solution of tetraisopropyltitanate (19 moles) in hexane were added over a 9 hour (32400 s) period. The resulting grayish-tan slurry was stirred for 2 hours (7200 s) prior to use. The Mg:Ti and Cl:Mg atomic ratios were both 10:1.

B. Polymerization

Ethylene was polymerized in a manner similar to (1-C) above, using 1.95 ml of 0.616 M triisobutylaluminum (1.2 mmoles) and an aliquot of catalyst prepared in (17-A) above containing 0.006 millimoles of titanium. The Al:Ti atomic ratio for the cocatalyst to titanium was 200:1. The dried polyethylene weighed 281 g, had a melt index, $I_2$ of 0.88, an $I_{10}/I_2$ of 11.35, and a bulk density of 20.3 lbs/ft$^3$ (0.35 g/cm$^3$). The catalyst efficiency was 981,584 g PE/g Ti.

EXAMPLE 18

A. Catalyst Preparation

To 78.5 ml of 0.637 M butylethylmagnesium (50.0 mmoles) was added 40.6 ml of 0.616 M ATB (12.5 mmoles). While stirring, 10.2 ml of ethyl alcohol (174.4 mmoles) were added dropwise so as to maintain a temperature of about 60° C. To the clear, colorless solution which formed was added 3.00 ml of 1.75 M solution of tetraisopropyltitanium in hexane (5.25 mmoles Ti). The solution remained clear and colorless. Then 162 ml of 1.53 M ethylaluminum dichloride (248 mmoles) were added dropwise at about 24° C. A brown slurry resulted. The catalyst slurry was gently stirred for three hours (10800 s) prior to use. The Cl:Mg atomic ratio was 10:1 and the Mg:Ti atomic ratio was 9.52:1. The ratio of ROH:R groups was 1:1.

B. Polymerization

An aliquot of catalyst prepared in (18-A) above, containing 0.006 mmoles of titanium was used to polymerize ethylene in the same manner as in (1-C) above, except 1.9 ml of 0.616 M ATB (1.17 mmoles) was used in place of 3.2 ml. The resulting cocatalyst, Al:Ti, atomic ratio was 195:1. The dried polyethylene weighed 292 g, had a melt index, $I_2$, of 1.12, an $I_{10}/I_2$ of 9.93, and a bulk density of 19.1 lbs/ft$^3$ (0.3056 g/cm$^3$). Catalyst efficiency was 1,013,000 g PE/g Ti.

EXAMPLE 19

A. Catalyst Preparation

While stirring 78.5 ml of 0.634 M butylethyl magnesium (50.0 moles), a solution consisting of 5.9 ml of ethyl alcohol (100.8 mmoles) and 13.1 ml of hexane was added dropwise to maintain a temperature of about 60° C. A gelatinous slurry resulted. Next, 3.0 ml of 1.75 M tetraisopropyltitanium (5.25 mmoles Ti) in hexane was added. The slurry remained colorless. Hexane was then added to give a volume of 130 ml. Next, 130 ml of 1.53 M ethylaluminum dichloride (199 mmoles) was added at a temperature of about 24° C. A reddish tan slurry resulted. The catalyst was stirred for one and one-half hours (5400 s) prior to use. The Mg:Ti atomic ratio was 9.5:1 and the Cl:Mg atomic ratio was 8:1. The ratio of ROH:R groups was 1:1.

B. Polymerization

Ethylene was polymerized in a manner as in Example (1-C) above, using 1.9 ml of 0.616 M ATB (1.17 mmoles) and an aliquot of catalyst prepared in (19-A) above, containing 0.06 mmoles of titanium. The cocatalyst, Al:Ti, atomic ratio was 195:1. The dried polyethylene weighed 270 g, had a melt index, $I_2$, of 0.96, an $I_{10}/I_2$ of 10.1, and a bulk density of 19.9 lbs/ft$^3$ (0.3184 g/cm$^3$). The catalyst efficiency was 937,500 g PE/g Ti.

EXAMPLE 20

A. Preparation of Stock Solution

In a nitrogen filled glove box, 314 ml of 0.637 M butylethylaluminum, BEM, (200 mmoles), 162 ml of 0.616 M triisobutylaluminum, ATB, (100 mmoles), and 60 ml of hexane were added to a 1200 ml beaker. Next, a solution of 52 ml hexane and 52.3 ml of 13.38 M normal propyl alcohol was added dropwise. The resulting clear colorless solution had a volume of 615 ml and was 0.325 M in magnesium. The ROH:R atomic ratio was 1:1.

B. Catalyst Preparation

To an 76.9 ml aliquot of the stock solution prepared in (20-A) above containing 25.0 mmoles of magnesium was added 1.5 ml of 1.68 M tetraisopropyltitanium (2.5 mmoles). The solution remained clear and colorless. Next, 64.9 ml of 1.54 M ethylaluminum dichloride (100 mmoles) was added dropwise at room temperature over a 0.6 hour period. The resulting slurry was stirred for 17 hours (61200 s) prior to use. The final catalyst slurry had a tannish brown color. The Mg:Ti atomic ratio was 10:1 and the Cl:Mg atomic ratio was 8:1.

C. Polymerization

An aliquot of the catalyst prepared in (20-B) above, containing 0.005 mmoles of titanium and 1.6 ml of 0.616 M triisobutylaluminum (0.99 mmole) were used to polymerize ethylene in the same manner as in Example (14-B) above. The Al:Ti atomic ratio for the cocatalyst was 200:1. The dried polyethylene weighed 220 g, had a melt index, $I_2$, of 2.58, an $I_{10}/I_2$ of 9.78, and a bulk density of 20.3 lb/ft$^3$ (0.325 g/cm$^3$). The catalyst efficiency was 916,670 g PE/g Ti.

D. Catalyst Preparation

To an 76.9 ml aliquot of the stock solution prepared in (20-A) above containing 25.0 mmoles of magnesium was added 1.4 ml of 9.1 M titanium tetrachloride. The titanium tetrachloride was added dropwise at about 28° C. over a 6 minute (360 s) period resulting in a white slurry. Next, 64.9 ml 1.54 M ethylaluminum dichloride (100 mmoles) was added dropwise at room temperature over a one hour (3600 s) period. The resulting slurry was stirred for 1.8 hours (6600 s) prior to use. The final catalyst slurry had a brown color. The Mg:Ti atomic ratio was 2:1 and the Cl:Mg atomic ratio was 8:1.

E. Polymerization

An aliquot of the catalyst prepared in (20-D) above, containing 0.005 mmoles of titanium and 1.6 ml of 0.616 M triisobutylaluminum (0.99 mmole) were used to polymerize ethylene in the same manner as in Example (14-B) above. The Al:Ti atomic ratio for the cocatalyst was 200:1. The dried polyethylene weighed 59 g, had a melt index, $I_2$, of 1.00, an $I_{10}/I_2$ of 9.50, and a bulk density of 22.0 lb/ft$^3$ (0.353 g/cm$^3$). The catalyst efficiency was 242,400 g PE/g Ti.

F. Catalyst Preparation

A 150 ml aliquot of the catalyst prepared in (20-D) above, was decanted a total of six times. The resulting brown slurry was brought to a volume of about 200 ml by the addition of hexane.

G. Polymerization

An aliquot of the catalyst prepared in (20-F) above, containing 0.005 mmoles of titanium and 1.6 ml of 0.616 M triisobutylaluminum (0.99 mmole) were used to polymerize ethylene in the same manner as in (14-B) above. The Al:Ti atomic ratio for the cocatalyst was 200:1. The dried polyethylene weighed 71 g, had a melt index, $I_2$, of 0.76, an $I_{10}/I_2$ of 10.25, and a bulk density of 19.5 lbs/ft$^3$ (0.353 g/cm$^3$). The catalyst efficiency was 292,300 g PE/g Ti.

COMPARATIVE EXPERIMENT I

A. Catalyst Preparation

To an 76.9 ml aliquot of the stock solution prepared in (20-A) above containing 25.0 mmoles of magnesium was added 1.4 ml of 9.1 M titanium tetrachloride. The titanium tetrachloride was added dropwise at about 28° C. over a 7 minute (420 s) period resulting in a white precipitate. The white catalyst precipitate was washed by decanting a total of six times.

B. Polymerization

An aliquot of the catalyst prepared in Comparative Experiment (I-A) above, containing 0.010 mmoles of titanium and 3.2 ml of 0.616 M triisobutylaluminum (1.97 mmoles) were used to polymerize ethylene in the same manner as in Example (14-B) above. The Al:Ti atomic ratio for the cocatalyst was 197:1. The dried polyethylene weighed 6 g. Due to the small amount of polymer, no $I_2$ data was obtained. The catalyst efficiency was 12,500 g PE/g Ti.

COMPARATIVE EXPERIMENT II

A. Catalyst Preparation

To a stirred solution of 78.5 ml of 0.637 M butylethyl mangnesium (50.0 mmoles) and 40.6 ml of 0.616 M ATB (25.0 mmoles), a solution consisting of 10.2 ml of ethyl alcohol (175 mmoles) and 10.0 ml of hexane was added dropwise so as to maintain a temperature of 60° C. To the resulting colorless solution, 5.7 ml of 1.75 M tetraisopropyltitanium (10.0 mmoles) was added. The solution remained colorless. Next, 65.4 ml of 1.53 M ethylaluminum dichloride (100.0 mmoles) were added dropwise at a temperature of about 24° C. The catalyst was heated at about 70° C. for 135 minutes (8100 s) prior to use. A brown slurry resulted. The Mg:Ti atomic ratio was 5:1 and the Cl:Mg atomic ratio was 4:1. The ratio of ROH to R groups was 1:1.

B. Polymerization

An aliquot of catalyst prepared in Comparative Experiment (II-A) above, containing 0.010 mmoles of titanium was added to a 2.5 liter stirred stainless steel reactor containing 1.5 liters of dry, oxygen-free hexane and 2.18 ml of 0.921 M triethylaluminum, (ATE) in hexane. The atomic ratio, Al:Ti, for the cocatalyst was 200:1. The reactor nitrogen atmosphere was replaced with hydrogen by purging, the reactor contents were heated to 85° C. and the reactor pressure was adjusted to 70 psig (483 kPa) with hydrogen. Ethylene was introduced into the reactor and was employed to maintain a total reactor pressure of 170 psig (1172 kPa). After 2 hours (7200 s) at 85° C., the reactor was cooled to room temperature and vented. The reactor contents were removed, filtered and dried under vacuum. The dried polyethylene weighed 425 g, had a melt index, $I_2$, of 4.25, an $I_{10}/I_2$ of 8.03, and a bulk density of 20.6 lbs/ft$^3$ (0.3296 g/cm$^3$). The catalyst efficiency was 868,000 g PE/g Ti.

COMPARATIVE EXPERIMENT III

A. Catalyst Preparation

While stirring, 64.9 ml of 1.54 M ethylaluminum dichloride (100 mmoles), 6.54 ml of n-propyl alcohol (87.5 mmoles) was added dropwise. The resulting solution was brought to a volume of 65 ml by the addition of hexane and then added dropwise to a stirred solution consisting of 39.25 ml of 0.637 M butylethyl magnesium (25 mmoles), 20.3 ml of 0.616 M triisobutylaluminum (12.5 mmoles) and 1.5 ml of 1.68 M tetraisopropyltitanium (2.5 mmoles). The resulting opaque brown slurry was stirred for 2 hours (7200 s) prior to use and had a Cl:Mg atomic ratio of 8:1 and a Mg:Ti atomic ratio of 10:1.

B. Polymerization

An aliquot of catalyst prepared in Experiment (III-A), above containing 0.005 mmole Ti and 1.6 ml of 0.616 M triisobutylaluminum (0.99 mmole) were used to polymerize ethylene in the same manner described in Example (14-B) above. The dried polyethylene powder weighed 91 g, had a melt index, $I_2$, of 2.24, an $I_{10}/I_2$ of 8.28, and a bulk density of 13.6. The catalyst efficiency was 386,900 g PE/g Ti.

COMPARATIVE EXPERIMENT IV

A. Catalyst Preparation

To 5.87 g of powdered magnesium ethoxide (51.0 mmoles) was added 50 ml of hexane. While stirring, 3.0 ml of 1.75 M solution of tetraisopropyltitanium in hexane (5.25 mmoles Ti) was added to give a colorless supernate. Then 166 ml of 1.53 ethylaluminum dichloride (254 mmoles) were added dropwise at about 24° C. A dark brown slurry resulted. The catalyst slurry was stirred for 24 hours (86400 s) prior to use. The Cl:Mg atomic ratio was 10:1 and the Mg:Ti atomic ratio was 10.3:1.

B. Polymerization

An aliquot of catalyst prepared in Comparative Experiment (IV-A) above, contaning 0.006 mmole of titanium was used to polymerize ethylene in the same manner as in Example (14-C) above, except 1.9 ml of 0.616 M ATB (1.17 mmoles) was used instead of 3.2 ml. The cocatalyst, Al:Ti, atomic ratio was 200:1. The dried polyethylene weighed 147 g, had a melt index, $I_2$, of 1.04, an $I_{10}/I_2$ of 10.35 and a bulk density of 18.2 lbs/ft$^3$ (0.2914 g/cm$^3$). Catalyst efficiency was 523,500 g PE/g Ti.

COMPARATIVE EXPERIMENT V

A. Catalyst Preparation

To 4.67 g of anhydrous magnesium chloride (49.0 mmoles) was added 50 ml of hexane. While stirring, 3.0 ml of 1.75 M solution of tetraisopropyltitanium in hexane (5.25 mmoles Ti) was added to give a colorless supernate. Then 160 ml of 1.53 ethylaluminum dichloride (245 mmoles) were added dropwise at a temperature of about 24° C. A dark brown slurry resulted. The catalyst was stirred for 60 hours (216000 s) prior to use. The Mg:Ti atomic ratio was 9.33:1 and the Cl:Mg atomic ratio was also 10:1.

B. Polymerization

An aliquot of catalyst prepared in Comparative Experiment (V-A) above, contaning 0.0125 mmole of titanium and 4.1 ml of 0.616 M ATB (2.53 mmoles) were used to polymerize ethylene in the same manner as in (14-C) above. The Al:Ti atomic ratio was 202:1. The dried polyethylene weighed 41 g, had a melt index, $I_2$, of 0.93, an $I_{10}/I_2$ of 9.57, and a bulk density of 6.6 lbs/ft$^3$ (0.1056 g/cm$^3$). The catalyst efficiency was 68,400 g PE/g Ti.

We claim:

1. In a process for the polymerization of one or more polymerizable ethylenically unsaturated monomers containing one or more polymerizable α-olefins under Ziegler polymerization conditions wherein the polymerization is conducted in the presence of (I) at least one cocatalyst or activator selected from aluminum, boron, zinc or magnesium compounds represented by the formulas $Al(R^3)_{3-a}X'_a$, $B(R^3)_{3-a}X'_a$, $MgR^3_2$, $MgR^3X'$, $ZnR^3_2$ or mixtures thereof wherein each $R^3$ is independently a hydrocarbyl group; X' is a halogen and a has a value of from zero to 2; and (II) a transition metal-containing catalyst; the improvement which comprises employing as the transition metal-containing catalyst an unseparated catalytic product resulting from admixing in an inert hydrocarbon diluent and in an atmosphere which excludes moisture and oxygen (A) at least one hydrocarbon soluble organo-magnesium material represented by the formula $R_2Mg.xMeR'_{x'}$, wherein each R is independently a hydrocarbonyl group having from 1 to about 20 carbon atoms, each R' is independently hydrogen or a hydrocarbyl or hydrocarbyloxy group having from 1 to about 20 carbon atoms, Me is Al, Zn or B, x has a value sufficient to render the magnesium compound hydrocarbon soluble and x' has a value equal to the valence of Me;

(B) at least one organic hydroxyl-containing material;

(C) at least one reducing halide source represented by the formula $Al(R^4)_{3-m}X_m$ or $B(R^3)_{3-m}X_m$ wherein each $R^3$ is independently hydrogen or a hydrocarbyl group, $R^4$ is ethyl and m has a value from 1 to 2; and (D) at least one transition metal (Tm) compound; and wherein (1) the components are added in the order (A), (B), (C) and (D) or (A), (B), (D) and (C); and (2) the components are employed in quantities so as to provide the following atomic ratios (a) Mg:Tm of from about 5:1 to about 100:1;

(b) Cl:Mg of from about 6:1 to about 20:1; and (c) the OH:total number of hydrocarbyl groups attached to a metal atom in component (A) is from about 0.5:1 to about 1.5:1.

2. A process of claim 1 wherein (1) Component (A) is represented by the formula $R_2Mg.xMeR'_{x'}$, wherein each R is independently a hydrocarbyl group having from 1 to about 20 carbon atoms; each R' is independently a hydrogen, hydrocarbyl or hydrocarbyloxy group having from 1 to about 20 carbon atoms; Me is Al, Zn or B; x has a value from zero to 10 and is sufficient to render the organomagnesium component hydrocarbon soluble; and x' has a value equal to the valence of Me;

(2) Component (B) is represented by the formulas (-R-(-O-R')$_n$OH and Z-(-(O-R')$_n$O-R")$_{n'}$ wherein each R is a hydrocarbyl group having from 1 to about 20 carbon atoms or a hydrogen; each R' is independently a divalent hydrocarbyl group having from 1 to about 20 carbon atoms; each R" is independently hydrogen or a hydrocarbyl group having from 1 to about 20 carbon atoms, at least one of which is hydrogen; Z is a multivalent organic group containing from 2 to about 20 carbon atoms; n has a value from zero to about 10; and n' has a value of from 2 to about 10;

(3) component (D) is represented by the formulas $TmY_nX_{z-n}$, or

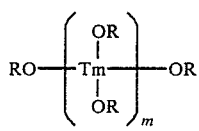

wherein Tm is a transition metal in its highest stable valence state and being selected from groups IV-B, V-B and VI-B of the Periodic Table of the Elements; Y is oxygen, OR" or NR$_2$"; R is a hydrocarbyl group having from 1 to about 20 carbon atoms; R" is hydrogen or a hydrocarbyl group having from 1 to about 20 carbon atoms; X is a halogen, preferably chlorine or bromine; z has a value corresponding to the valence of the transition metal, Tm; m has a value from 1 to 20; n has a value of from zero to 5 with the value of z−n being from zero up to a value equal to the valence state of the transition metal, Tm;

(4) the atomic ratio of Mg:Tm is from about 5:1 to about 40:1;

(5) the atomic ratio of Cl:Mg is from about 8:1 to about 12:1; and (6) the ratio of OH groups in component (B): total number of hydrocarbyl groups attached to a metal atom in component (A) is from about 0.7:1 to about 1.2:1.

3. A process of claim 2 wherein (1) in component (A) each R and R' is a hydrocarbyl group having from 1 to about 10 carbons, Me is Al and x has a value of from about 0.2 to about 2;

(2) component (B) is an alcohol having from 1 to about 10 carbon atoms;

(3) component (C) is an aluminum alkyl halide wherein each R$^3$ is independently a hydrocarbyl group having from 1 to about 10 carbons and X is chlorine;

(4) in component (D), each R independently has from 1 to about 10 carbon atoms;

(5) in component (D), Tm is titanium;

(6) in component (D), m has a value of from 1 to about 10; and (7) the atomic ratio of Mg:Tm is from about 5:1 to about 20:1.

4. A process of claim 3 wherein (1) component (A) is butylethylmagnesium.$\frac{1}{2}$ triisobutylaluminum, dibutylmagnesium.$\frac{1}{2}$ triisobutylaluminum, dihexylmagnesium.$\frac{1}{2}$ triisobutylaluminum, or butyl octyl magnesium.$\frac{1}{2}$ triisobutyl aluminum;

(2) component (B) is n-propyl alcohol, 2-pentanol or n-octyl alcohol;

(3) component (C) is ethylaluminum dichloride, ethylaluminum sesquichloride, diethylaluminum chloride; and (4) component (D) is tetraisopropoxytitanium, titanium tetrachloride, tetra-n-butoxytitanium, tetra(2-ethylhexoxy)titanium or isopropyltitanate decamer.

5. A process of claims 1, 2, 3 or 4 wherein ethylene, or a mixture of ethylene and one or more α-olefins having from 3 to about 10 carbon atoms are polymerized under slurry polymerization conditions employing a cocatalyst containing aluminum, zinc, boron, magnesium or a mixture thereof.

6. A process of claim 5 wherein a mixture of ethylene and one or more of butene-1, hexene-1 or octene-1 are polymerized.

7. A process of claims 1, 2, 3 or 4 wherein ethylene, or a mixture of ethylene and one or more α-olfins having from 3 to about 10 carbon atoms are polymerized under solution polymerization conditions.

8. A process of claim 7 wherein a mixture of ethylene and one or more of butene-1, hexene-1 or octene-1 are polymerized.

* * * * *